(12) United States Patent
Niesing et al.

(10) Patent No.: US 8,106,614 B2
(45) Date of Patent: Jan. 31, 2012

(54) MIRROR ADJUSTMENT MECHANISM, WING MIRROR UNIT AND METHOD

(75) Inventors: Willem Niesing, Ede (NL); Bastiaan Huijzers, Dordrecht (NL)

(73) Assignee: MCi (Mirror Controls International) Netherlands, B.V., Montfoort (NL)

( * ) Notice: Subject to any disclaimer, the term of this patent is extended or adjusted under 35 U.S.C. 154(b) by 224 days.

(21) Appl. No.: 12/375,131

(22) PCT Filed: Jul. 26, 2007

(86) PCT No.: PCT/NL2007/050373
§ 371 (c)(1),
(2), (4) Date: Oct. 26, 2009

(87) PCT Pub. No.: WO2008/013453
PCT Pub. Date: Jan. 31, 2008

(65) Prior Publication Data
US 2010/0045225 A1    Feb. 25, 2010

(30) Foreign Application Priority Data

Jul. 26, 2006  (NL) ..................................... 1032235

(51) Int. Cl.
*H02P 7/00*          (2006.01)
(52) U.S. Cl. ................... 318/434; 318/650; 318/400.22; 318/782
(58) Field of Classification Search .............. 318/650, 318/400.21, 400.22, 782, 785, 786, 434; 361/5, 23, 31, 57, 631; 327/53, 65, 66, 206, 327/207, 208; 323/276, 277, 278
See application file for complete search history.

(56) References Cited

U.S. PATENT DOCUMENTS

| | | | | |
|---|---|---|---|---|
| 5,585,701 A * | 12/1996 | Kaida et al. | ............. | 318/400.27 |
| 7,129,775 B2 * | 10/2006 | Arigliano | ...................... | 327/543 |
| 7,184,249 B2 * | 2/2007 | Vermeulen et al. | ............. | 361/23 |
| 7,525,333 B1 * | 4/2009 | Bertin | ...................... | 324/762.07 |
| 7,759,892 B2 * | 7/2010 | Sho et al. | ...................... | 318/467 |

FOREIGN PATENT DOCUMENTS

EP      1393975 A      3/2004
JP      08207663 A     8/1996

OTHER PUBLICATIONS

European Patent Office; International Search Report for PCT/NL2007/050373, mailed Oct. 26, 2007.

* cited by examiner

*Primary Examiner* — Bentsu Ro
*Assistant Examiner* — Thai Dinh
(74) *Attorney, Agent, or Firm* — Dykema Gossett PLLC

(57) ABSTRACT

An electric motor circuit for controlling an electric motor of a mirror adjustment mechanism includes a switch-off circuit that is provided with a current sensor for measuring the electrical supply current and, depending thereon, generating a voltage. In an embodiment, a current branch is configured to be rendered conductive in response to the generated voltage; an electronic switch is configured to interrupt the supply current as a result of the current branch being rendered conductive. The current branch may be configured to form a first branch of a current mirror which is out of balance and is dimensioned such that the first branch does not carry current under normal operating conditions of the motor, and a second branch is conductive. In an embodiment, upon the occurrence of a supply current that is greater than a predetermined critical level, the first branch is also rendered conductive.

13 Claims, 7 Drawing Sheets

MIRROR ADJUSTMENT MECHANISM, WING MIRROR UNIT AND METHOD

REFERENCE TO RELATED APPLICATIONS

This application claims the benefit of National stage application (under 35 U.S.C. 371) of PCT/NL/2007/050373 filed Jul. 26, 2007, which claims the benefit to Netherlands Application No. 1032235, filed Jul. 26, 2006.

TECHNICAL FIELD

The invention relates to an electric motor circuit for controlling an electric motor of a mirror adjustment mechanism, wherein the circuit is arranged for driving the electric motor and for switching off the electric motor when an electrical supply current is greater than a predetermined critical level, wherein the circuit is provided with a current sensor for measuring the electrical supply current and, depending thereon, generating a voltage, a current branch which is arranged to be rendered conductive in response to the generated voltage, and an electronic switch for interrupting the supply current as a result of the current branch being rendered conductive.

BACKGROUND OF THE INVENTION

Such an electric motor circuit is known, for instance, from the European patent publication EP 1 393 975. By activating the electric motor through the circuit, the mirror adjustment mechanism can pivot a mirror housing relative to a bodywork on which the mirror housing is mounted. This allows the user of a motor vehicle, from the driver's space, to cause the mirror housing to fold in or fold out between a working position in which the mirror housing is oriented substantially transversely relative to the bodywork and a folded-in position in which the mirror housing is oriented rearwards and alongside the bodywork. For instance when maneuvering during parking, the driver can then, to reduce the width of the vehicle, bring the mirror housing from the working position to the folded-in position.

Upon reaching an end position, such as the working position or the folded-in position, the mirror housing cannot pivot further relative to the bodywork, so that the operation of the electric motor is blocked. When the electric motor remains switched on, relatively high supply currents occur in the windings of the motor, which may drastically reduce the life of the motor. To obviate high currents in the electric motor, the electric motor circuit is further arranged to switch off the electric motor when the electrical supply current is greater than a predetermined critical level.

In the circuit as described in EP 1 393 975, the current sensor is integrated in the electrical switch which is designed as a FET. A relatively high current results in a rise of the voltage of the base of a bipolar transistor, which thereby becomes conductive, so that an associated current branch starts to carry current. As a result, the potential on the gate of the FET falls, so that the FET does not pass any electrical current anymore. Since the FET is connected in series with the electric motor, the electric motor switches off.

For the above-mentioned bipolar transistor to be rendered conductive, a sufficiently high electrical voltage needs to be provided to the base. Before a sufficiently high voltage has been built up, the electrical supply current reaches a relatively high value and/or the conducting path of the FET has a relatively high resistance. The object of the circuit is precisely to avoid the first situation. However, the second situation, that is, designing the FET with a relatively high resistance, is also unwanted, since in that case less effective power becomes available to the electric motor itself.

SUMMARY OF THE INVENTION

The object of the invention is to provide an electric motor circuit of the type indicated in the opening paragraph hereof, where the disadvantages mentioned are avoided while maintaining the advantages. In particular, the object of the invention is to obtain an electric motor circuit of the type indicated in the opening paragraph, where, without use of an electronic switch with a relatively high conduction resistance, the electric motor can yet be switched off before a relatively great supply current occurs. To that end, the current branch forms a first branch of a current mirror which is out of balance and is dimensioned such that the first branch does not carry current under normal operating conditions of the motor and a second branch is conductive, and that upon the occurrence of a supply current that is greater than the predetermined critical level, also the first branch is rendered conductive.

By implementing a current mirror rendered out of balance in the electric motor circuit, the first branch can already be rendered conductive upon a relatively low voltage build-up by the current sensor. For generating a relatively low voltage build-up, a current sensor can be used whose conducting channel has a relatively low resistance, while yet the occurrence of relatively high supply currents in the electric motor is avoided.

Consequently, a relatively large part of the presented electrical voltage becomes available for the electric motor, which enhances energetic efficiency. A high energetic efficiency, in addition to being advantageous during operation under normal operating conditions of the motor, is also advantageous when initiating an adjustment of the mirror adjustment mechanism.

Owing to the relatively low resistance of the current sensor, thus a relatively low part of the available power is converted into heat by the current sensor. In addition to the energetic advantage, this moreover provides enhanced reliability of the current sensor. Also, the current sensor can be made of more compact design, which is of particular relevance in realizing a mirror adjustment mechanism where in the course of time the desired functionality increases more and more with a miniaturization of an integrated circuit on which the electric motor circuit is realized.

An additional advantage occurs when the invention is used in combination with an electric motor circuit that is made of complementary design for bipolar control of the electric motor, thereby eliminating, for reasons of cost, diodes that realize a parallel current path with a low resistive value to prevent two current sensors carrying current simultaneously. The fact is that the circuit can be provided with two complementary measuring sensors that are arranged in series relative to the electric motor. As a result of voltage division, the available power of the electric motor decreases correspondingly. Owing to the possibility that, without the disadvantageous effect of a high permitted supply current, yet current sensors with a relatively low resistance can be used, the available motor power increases still further.

By using at the first and the second branch of the current mirror a first and a second resistance, respectively, for setting the magnitude of the electrical current through the first and the second branch of the current mirror, respectively, with the first resistance being somewhat smaller than the second resistance, the setting current of the first branch is slightly greater than the setting current of the second branch. Consequently, also the base-emitter voltage that is required for rendering the transistor of the respective current branch conductive is greater for the first current branch than for the second current branch. The second current branch can then be conductive while the first current branch is not so yet. By choosing the first resistance only slightly smaller than the second resistance, only a very slight voltage rise is needed for rendering the first current branch conductive. Advantageously, the setting of the predetermined critical level of the supply current and the resistive value of the conducting path in the current sensor can thus be optimized. Thus, a fast switch-off of the electric motor can be realized. Incidentally, the first resistance can also be chosen to be significantly smaller than the second resistance, so that the design parameters in the setting of the switch-off circuit are less critical.

Advantageously, the conducting path of the electronic switch can form at least a part of the current sensor. As a result, an extra component for realizing the function of the current sensor can be dispensed with. This means a further saving of space and costs. Moreover, through a reduction of the number of components of the circuit, the reliability of the operation thereof increases. It is noted that the current sensor, at least partly or wholly, can also be designed otherwise, for instance as a measuring resistance or as a set of parallel-connected measuring resistances. In such an embodiment, an electrical connection component in series with the electronic switch forms at least a part of the current sensor. Thus, at least a part of the current sensor can be simply realized by a conducting path on a printed circuit board, for instance a printed track element, which preferably has a well-defined resistive value. Incidentally, the electrical connection component which, in series with the electronic switch, forms at least a part of the current sensor can also be implemented as a discrete element.

Preferably, the resistance of the conducting path is lower than about 0.1 ohm, so that the dissipated power in the conducting path is only very slight. Thus, the current sensor can be formed with advantage by the conducting channel of an electronic switch designed as a FET, with the resistance of the conducting channel being for instance about 0.05 ohm. If desired, the resistance of the conducting path of the current sensor can naturally be chosen to be greater than about 0.1 ohm.

In an advantageous embodiment according to the invention, the circuit is further arranged for causing the supply current to increase gradually at the start-up of the electric motor. What is realized in this way is a gradual force build-up in the electric motor and a reduction of the mechanical tension in transmission mechanisms, such as gearwheels, in a driving mechanism of the mirror adjustment mechanism, which prolongs the life of the motor and the works of the mirror adjustment mechanism and reduces noise attendant on the start-up of the motor.

It is noted that the circuit that is arranged for causing the supply current to increase gradually at start-up of the electric motor can be used not only in combination with an electric motor circuit according to claim 1, but also more generally in combination with an electric motor circuit for controlling an electric motor of a mirror adjustment mechanism, comprising a drive circuit for driving the electric motor.

Preferably, to that end, the terminal for the ground of the electric motor is provided with a feedback using a high-pass filter, whereby, more preferably, the electronic switch is grounded via a transient short-circuit connection, so that a temporary short-circuit is realized. As is known to those skilled in the art, the circuit can also be otherwise so implemented for causing the supply current to increase gradually at the start-up of the electric motor, for instance using control program.

In an alternative embodiment, an additional resistive element is connected in series with the electric motor, the additional resistive element being arranged such that the resistive value decreases with increasing operating temperature. At start-up of the electric motor, the whole circuit still has a relatively low temperature, so that the resistive value is relatively high and relatively little current flows through the motor. With the passage of time, the temperature increases through heat development, so that the resistive value of the additional resistive element decreases correspondingly. Consequently, the current through the motor can increase until a stationary situation has been reached. In this way, advantageously, a cost-efficient implementation has been obtained for causing the supply current to increase gradually at the start-up of the electric motor.

Further advantageous embodiments of the invention are set forth in the subclaims.

BRIEF DESCRIPTION OF THE DRAWINGS

The invention will be further elucidated on the basis of exemplary embodiments that are represented in the drawing. In the drawing.

DETAILED DESCRIPTION OF THE EMBODIMENTS

Figure 1:
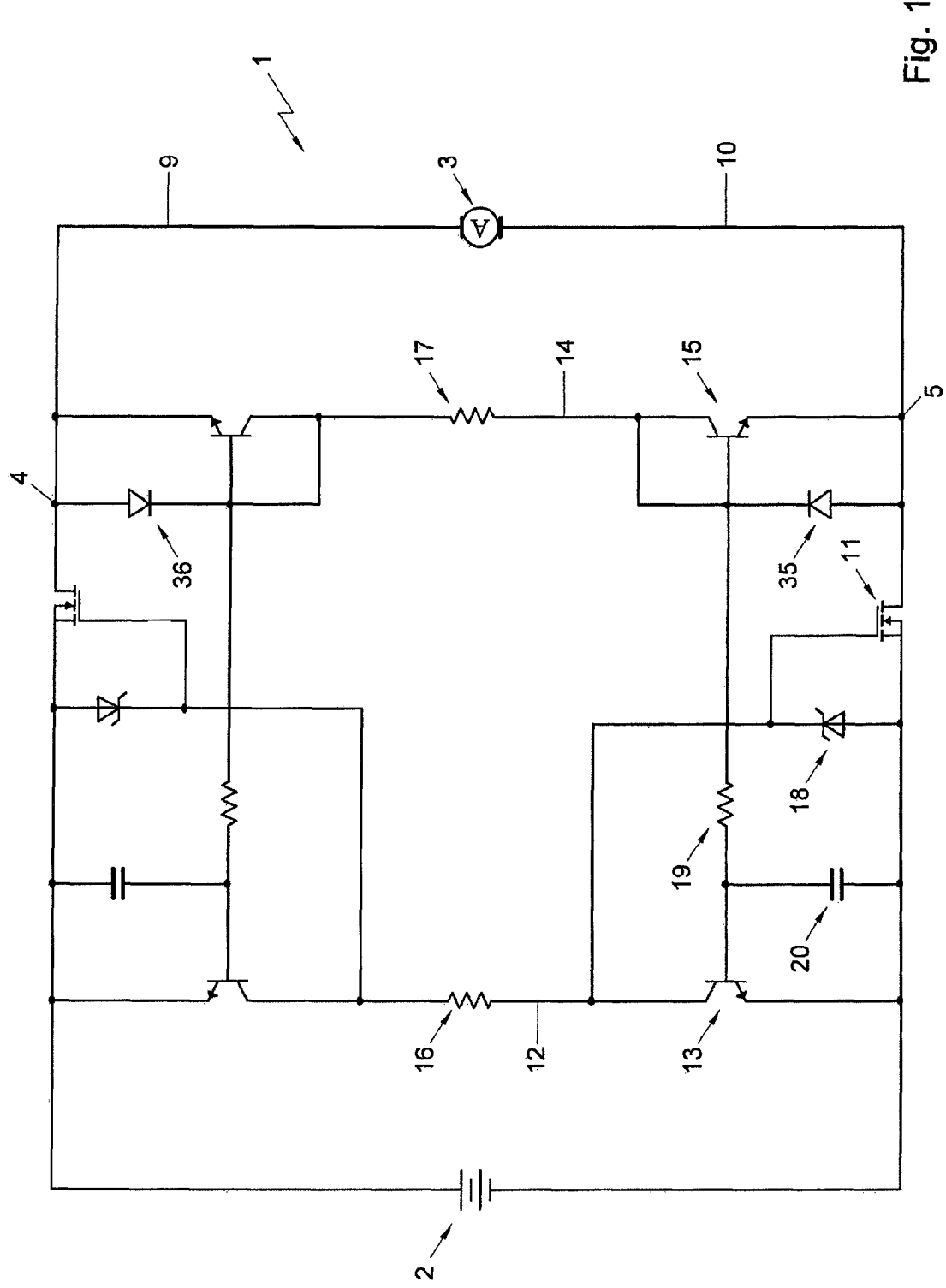
FIG. 1 shows a first embodiment of an electric motor circuit according to the invention.

The figures are only schematic representations of preferred embodiments of the invention. In the figures, equal or corresponding parts are indicated with the same reference numerals.

FIG. 1 shows a first embodiment of an electric motor circuit 1 according to the invention. The circuit is connected to a supply source, designed as a voltage source 2, such as a battery. Further, the circuit 1 is connected to an electric motor 3 of a mirror adjustment mechanism for a motor vehicle. The electric motor 3 is of the DC-type. The circuit is connected via a first and a second terminal 4, 5 to the two poles of the electric motor 3. The circuit 1 is arranged for driving the electric motor 3. The circuit 1 comprises a first electrical connection 9 between a pole of the voltage source 2 and the first terminal 4 of the electric motor 3. Furthermore, the circuit 1 comprises an electrical connection 10 between the second terminal 5 of the electric motor 3 and a second pole of the voltage source 2, the second connection 10 including an electronic switch 11.

Furthermore, the circuit 1 is arranged for switching off the electric motor 3 when an electrical supply current that flows through the electric motor 3 is greater than a predetermined critical level. The circuit 1 has a current mirror that is slightly out of balance, where a first branch 12 with a first bipolar transistor 13 does not carry current during normal operating conditions, and a second branch 14 with a second bipolar transistor 15 is in a conductive state during normal operating conditions.

The electronic switch 11 has been included in the circuit 1 in such a manner that the conducting channel of the switch 11 is series-connected with the second electrical connection 10 of the drive circuit 6. The electronic switch 11 is designed as a FET. The gate of the FET 11 is connected on the collector side of the first bipolar transistor 13 with the first current branch 12 of the current mirror.

Figure 2:
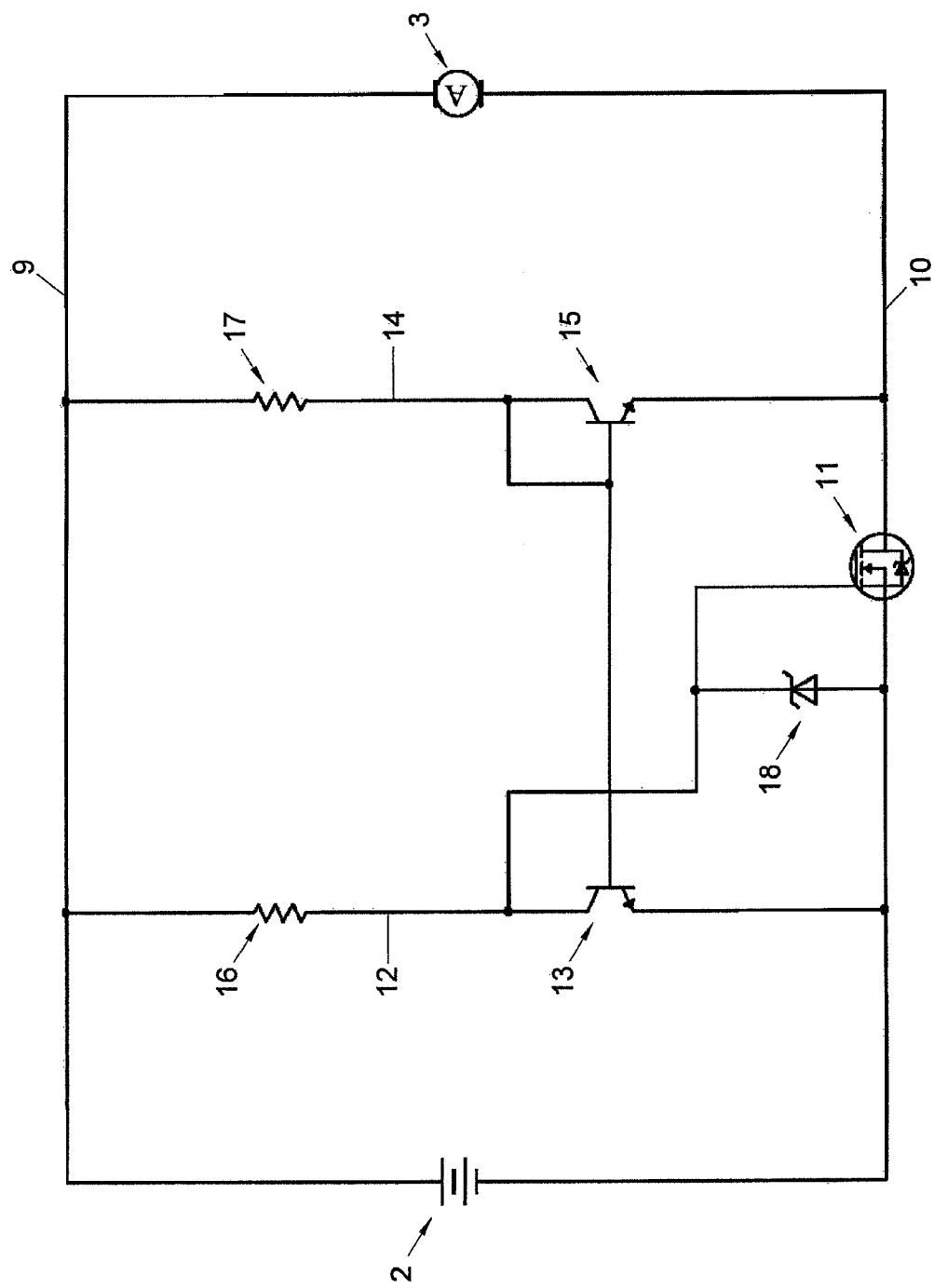
FIG. 2 shows a subcircuit of the electric motor circuit of FIG. 1.

The operation of the current mirror will be elucidated with reference to the subcircuit of the electric motor circuit 1, as shown in FIG. 2. The subcircuit is a simplified representation of a part of the electric motor circuit 1 from FIG. 1. Both current branches comprise a series-connected setting resistance, viz. a first resistance 16 for the first current branch 12 and a second resistance 17 for the second current branch 14. To set the slightly out-of-balance current mirror as described above, the resistive value of the first resistance 16 is slightly smaller than the resistive value of the second resistance 17. As a result, the setting current of the first current branch 12 and the base-emitter voltage of the first bipolar transistor 13 required therefor are greater than the setting current of the second current branch 14 and the base-emitter voltage of the second bipolar transistor 15 required therefor, respectively. The conducting path of the FET 11 functions as a current sensor, as will be elucidated below.

Under normal operating conditions of the electric motor 3, the base-emitter voltages of the bipolar transistors 13 and 15 are such that the first current branch 12 does not conduct and the second current branch 14 does. When an end position of the mirror adjustment mechanism is reached, the supply current flowing through the electric motor 3 augments, for instance from about 0.5 ampere to 2 ampere. Consequently, also the voltage drop across the source and drain of the FET 11 augments, since the conducting channel of the FET 11 behaves resistively in first order. If the supply current reaches a predetermined critical level, the current sensor thus generates a voltage which, via the base-emitter voltage of the second bipolar transistor 15, causes an increase of the base voltage of the first bipolar transistor. In response to this voltage rise, the bipolar transistor 15 becomes conductive, as does the associated first current branch 12. As a consequence of the first current branch 12 being rendered conductive, the voltage on the collector side of the first bipolar transistor 13 falls. As a result, the voltage of the gate of the FET 11 falls, so that the FET 11 breaks the electrical connection 10 between the electric motor 3 and the supply source 2. Consequently, the supply current of the electric motor 3 is interrupted, so that the occurrence of too large currents through the electric motor 3 is counteracted.

It is noted that when current is carried through the first current branch 12, a connection with the supply has been obtained via the extra diode 36, and via the extra diode 35 in the complementary case.

The resistive value of the first resistance 16 is preferably between about 20% and about 100% greater than that of the second resistance 17. Incidentally, the resistive value of the first resistance 16 can also be chosen to be a lesser percentage greater than that of the second resistance 17, in some cases only about one or a few percents. Generally, the value of the resistive value of the first resistance 16 can approximate that of the second resistance 17 more closely according as the resistive value of the current sensor is lower.

By the use of a FET 11 and because the conducting path of the FET 11 forms the current sensor, the additional advantage has been obtained that upon an increase of the supply current through the conducting path a positive feedback in rendering the first current branch 12 conductive is realized. The fact is that as a result of the increased supply current, the temperature of the FET 11 increases, so that also the resistance value of the conducting path increases, which has as a consequence that the voltage generated by the current sensor increases correspondingly. As a result, the first current branch 12 will become conductive sooner and/or the first current branch 12 remains conductive more easily. Moreover, as a result of the increased temperature of the FET 11, also the threshold voltage increases. Consequently, upon decrease of the gate voltage, the FET 11 will sooner switch off and/or remain in switched-off condition. So, both effects, viz. the increased resistive value of the conducting path and the increased threshold voltage, contribute to the positive feedback in the switching-off of the FET 11.

By providing the circuit with a positive feedback, the electrical state after the first current branch 12 of the current mirror has been rendered conductive, can be stabilized, so that unnecessary consecutive switching on and off of the electronic switch can be prevented. The positive feedback in this embodiment is partly realized by coupling the terminal of the low voltage of the electric motor, the second terminal 5, to the gate of the FET 11. As is known to the skilled person, however, the positive feedback can also be accomplished otherwise, for instance as has already been remarked above in connection with the FET 11.

The resistive value of the conducting channel of the FET 11 is about 0.05 ohm, but can also be chosen to be greater or smaller, for instance about 0.1 ohm or about 0.02 ohm.

The circuit 1 comprises a zener diode 18 for protecting the gate voltage of the FET 11. Although the electronic switch in the embodiment shown is designed as a FET 11, other implementations of the electronic switch are also conceivable, for instance as a relay in combination with separate current sensors.

As shown in FIG. 2, the transfer of the voltage generated by the current sensor to the first branch 12 of the current mirror is instantaneous, without after-effect. As a consequence, a low-pass filter used in the prior art, for instance designed as a first order network, can be eliminated, leading to still further cost reduction, saving of space and higher reliability. Since the conducting path of the FET 11 forms the current sensor, the heat-dependent character of the FET 11, as described above, is in fact used as a filter to prevent the first current branch 12 being alternately rendered momentarily conductive and nonconductive. It is noted that by the use of an explicit low-pass filter the low-pass characteristic can be set independently of the electronic switch used. Such an optional low-pass filter is implemented in the circuit 1 of FIG. 1, viz. with the aid of a resistance 19 between the two bases of the first and the second bipolar transistor 13, 15, as well as with the aid of a capacitor 20 which is connected in parallel with respect to the base-emitter of the first bipolar transistor 13.

Figure 3:
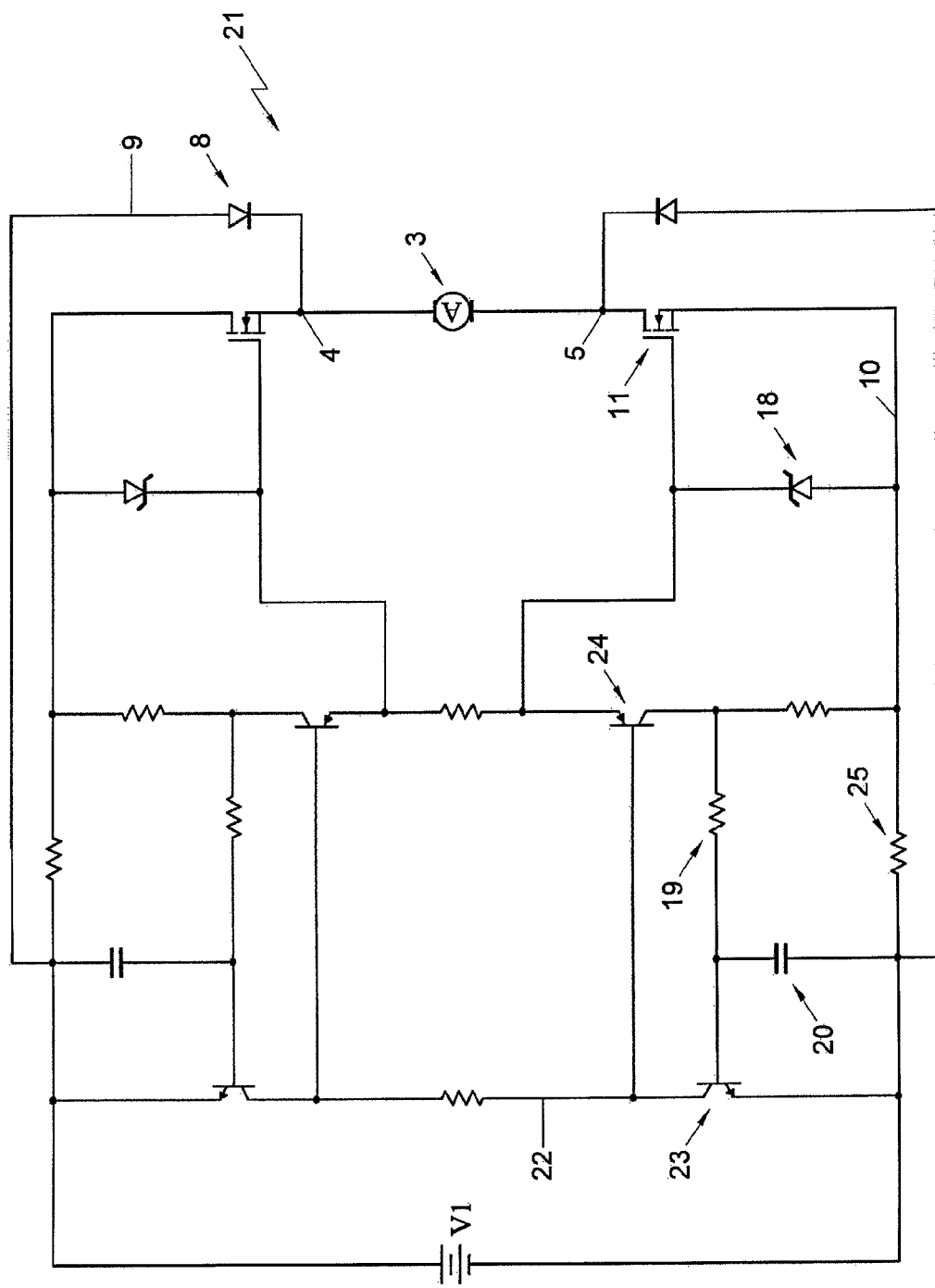
FIG. 3 shows an electric motor circuit according to the prior art.

FIG. 3 shows an electric motor circuit 21 according to the prior art. The greater part of the circuit 21 corresponds to electric motor circuit 1 according to the invention. However, what is used instead of a current mirror is a current branch 22 with a first bipolar transistor 23 which becomes conductive when the current sensor generates a voltage increase approximately amounting to the base-emitter voltage of the first bipolar transistor 23. The current branch 22 rendered conductive switches off the FET 11 via a conducting path via a second bipolar transistor 24 rendered conductive. For rendering the current branch 22 conductive, however, a relatively great supply current and/or a current sensor having a relatively great resistive value is needed. Furthermore, in contrast with the electric motor circuit according to FIGS. 1 and 2, the current sensor is designed as a measuring resistance 24. In addition, in the first electrical connection 9 a diode 8 is included which provides a parallel current path that prevents the current sensors of the complementary circuit from carrying current simultaneously, which would lead to an unwanted voltage loss.

Figure 4:
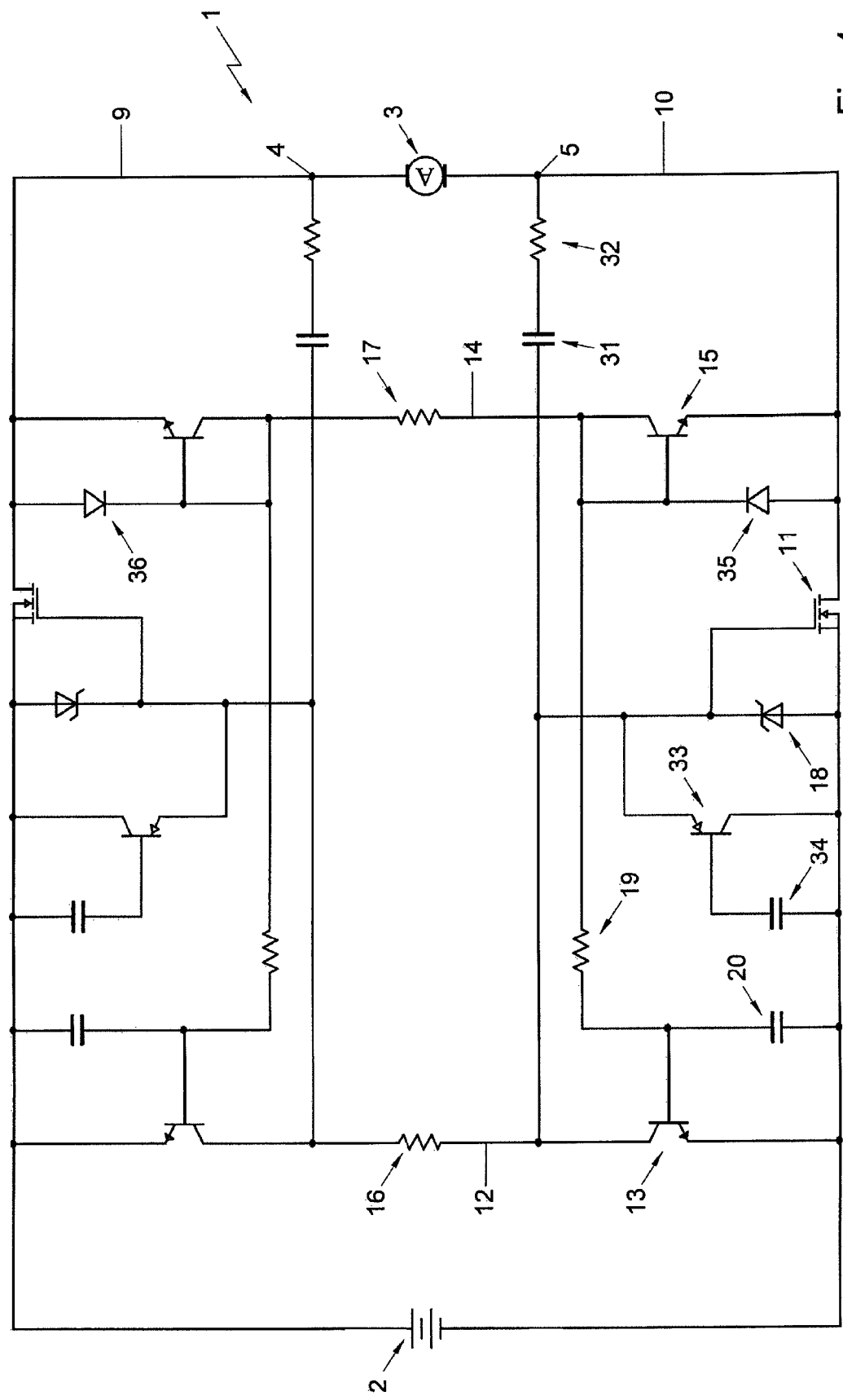
FIG. 4 shows a second embodiment of an electric motor circuit according to the invention.

FIG. 4 shows a second embodiment of an electric motor circuit 1 according to the invention. Here, the circuit 1 comprises an additional circuit for causing the supply current to increase gradually at the start-up of the electric motor 3. To that end, a feedback has been realized between the second terminal 5 of the electric motor 3 and the gate of the FET 11. The feedback comprises a high-pass filter, implemented as a series-connected capacitor 31 and resistance 32. Furthermore, the feedback comprises a transient short-circuit connection which is connected in parallel with respect to the gate of the FET 11, so that momentarily a temporary short-circuit can be realized.

Figure 5:
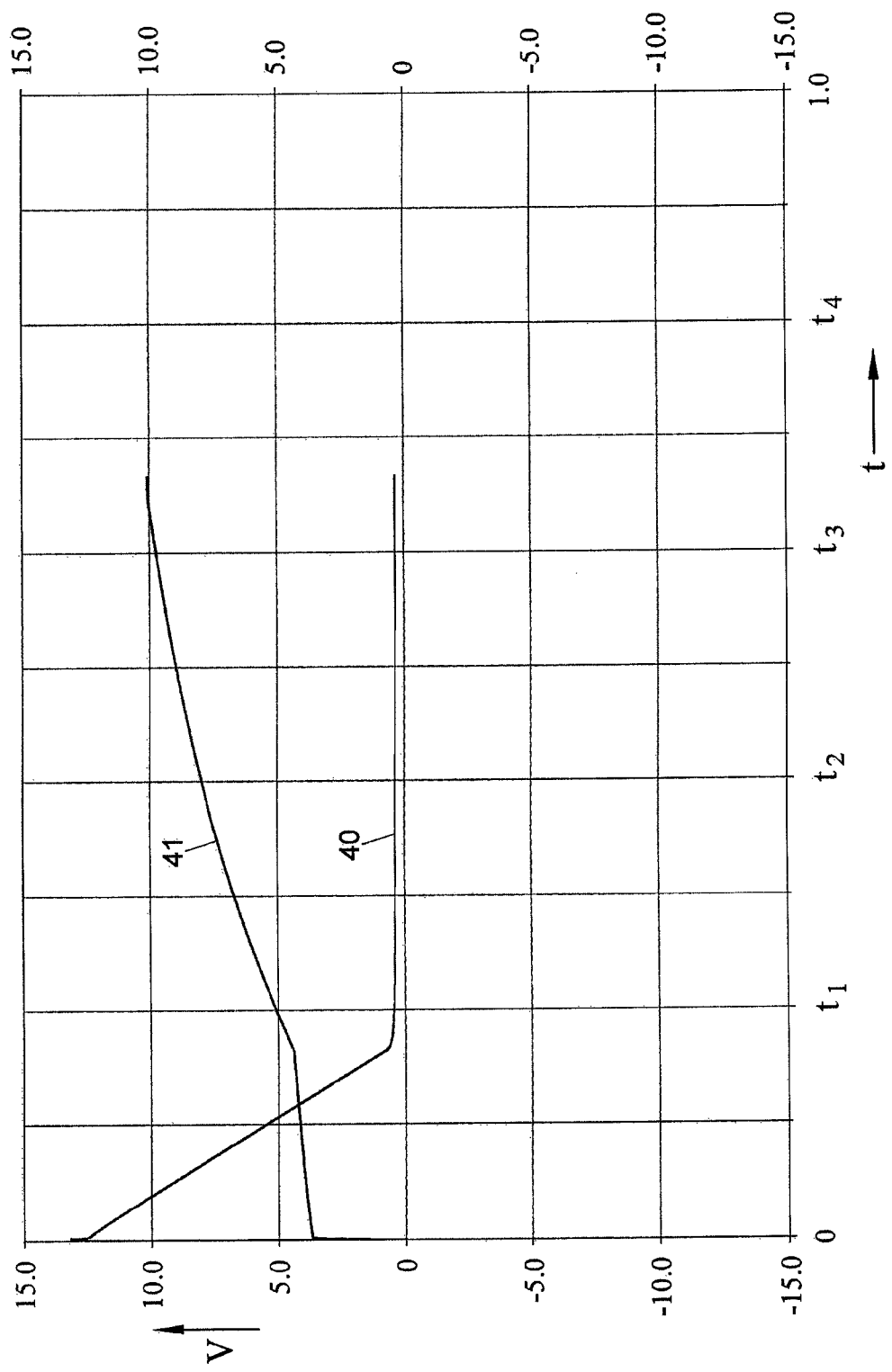
FIG. 5 shows a graphic representation of voltages occurring at start-up of an electric motor using the electric motor circuit of FIG. 4.

FIG. 5 shows a graphic representation of voltages that occur at start-up of an electric motor using the electric motor circuit of FIG. 4. The horizontal axis plots time t, while the vertical axis plots the voltage V. The symbols $t_1$, $t_2$, $t_3$ and $t_4$ represent 200 ms, 400 ms, 600 ms and 800 ms, respectively. As shown, by means of the high-pass filter and the transient short-circuit connection, the voltage 41 of the gate during the switching on of the electric motor 3 is kept relatively low, while the voltage 40 of the drain of the FET 11 falls relatively slowly. As a result, the initial voltage across the electric motor 3 is low, so that the supply current that flows through the windings of the motor increases gradually and the motor 3 is activated gradually.

Preferably, the electric motor 1 is dimensioned such that the supply current becomes stationary only after about 100 ms, more preferably after about 200 ms.

Figure 6:
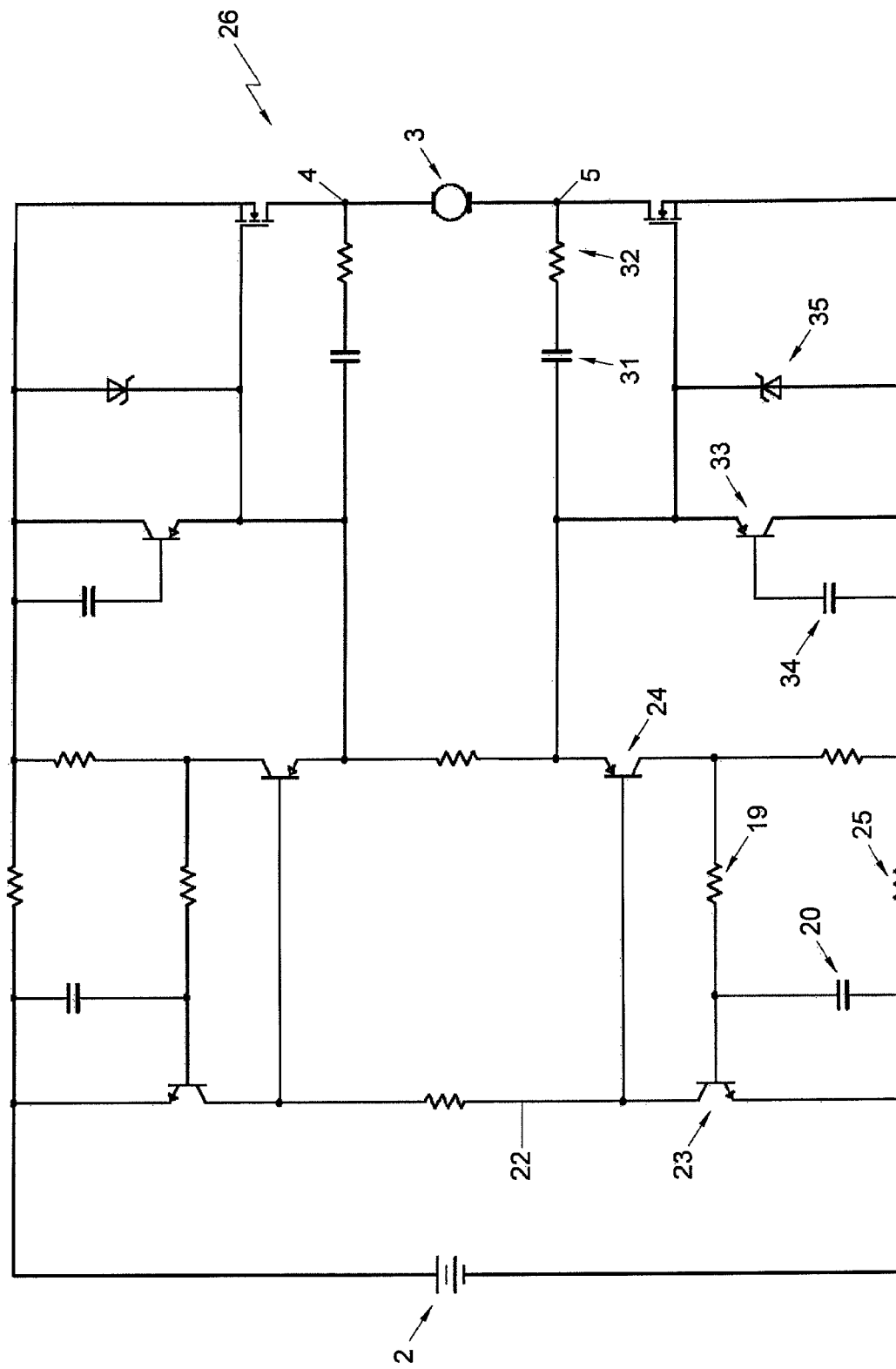
FIG. 6 shows a third embodiment of an electric motor circuit according to the invention.

Furthermore, FIG. 6 shows a third embodiment of an electric motor circuit 1 according to the invention. In the third embodiment, the idea of causing the supply current to increase gradually at start-up of the electric motor 3 has been applied to the electric motor circuit 21 as shown in FIG. 3. To that end, the electric motor circuit 26 in FIG. 6 comprises the high-pass filter and the transient short-circuit connection from FIG. 4.

Figure 7:
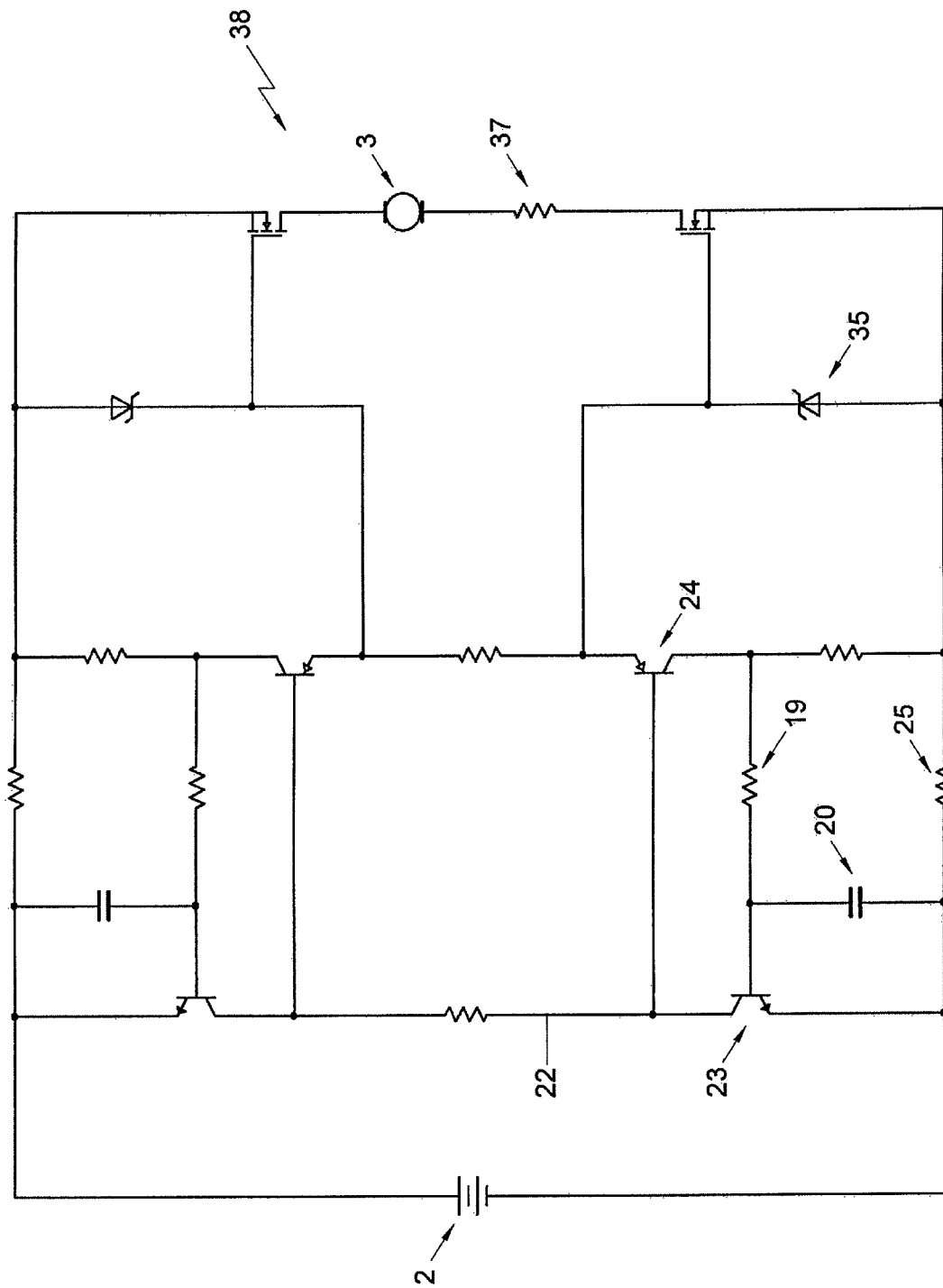
FIG. 7 shows a fourth embodiment of an electric motor circuit according to the invention.

FIG. 7 shows a fourth embodiment of an electric motor circuit according to the invention, whereby an alternative implementation 38 has been realized for causing the supply current to increase gradually at start-up of the electric motor 3. An additional resistive element 37 has been connected in series with the electric motor 3. The additional resistive element 37, also called negative temperature coefficient (NTC) resistance, is arranged such that the resistive value decreases with increasing operating temperature. Owing to the initially low operating temperature of the circuit, the supply current at first remains limited by the relatively high resistive value of the NTC resistance 37. It is noted that the embodiments as shown in FIGS. 6 and 7 can in principle be combined, for instance to ensure the gradual increase of the supply current of the electric motor 3 with still greater certainty.

The invention is not limited to the exemplary embodiments described here. Many variants are possible.

For instance, the electric motor circuit may be of complementary design for selective forward or reverse drive of a DC-type electric motor, as desired, or may be of single design for driving an electric motor in a desired direction.

Also, the transient short-circuit connection from FIGS. 4 and 6 can be designed otherwise.

Such variants will be clear to those skilled in the art and are understood to fall within the scope of the invention as set forth in the following claims.

The invention claimed is:

1. An electric motor circuit for controlling an electric motor of a minor adjustment mechanism comprising:
   a circuit including a current sensor, a current branch, and an electronic switch;
   wherein the circuit is configured to drive an electric motor and for switching off said electric motor when an electrical supply current is greater than a predetermined critical level;
   wherein the current sensor is configured to measure an electrical supply current and, depending thereon, generating a voltage;
   wherein the current branch is configured to be rendered conductive in response to the generated voltage;
   wherein the electronic switch is configured to interrupt the supply current as a result of the current branch being rendered conductive; and
   wherein the current branch forms a first branch of a current mirror which is out of balance and is dimensioned such that the first branch under normal operating conditions of said motor does not carry current and a second branch is conductive, and that upon the occurrence of a supply current that is greater than the predetermined critical level, the first branch is also rendered conductive.

2. An electric motor circuit according to claim 1, wherein the first and second branch of the current mirror, respectively, comprise a first and a second resistance for setting the magnitude of the electrical current through the first and the second branch of the current mirror, respectively, and wherein the first resistance is slightly smaller than the second resistance.

3. An electric motor circuit according to claim 1, wherein the electronic switch is designed as a FET.

4. An electric motor circuit according to claim 1, wherein a conducting path of the electronic switch forms at least a part of the current sensor.

5. An electric motor circuit according to claim 1, wherein an electrical connection component in series with the electronic switch forms at least a part of the current sensor.

6. An electric motor circuit according to claim 4, wherein a resistance of the conducting path is lower than about 0.1 ohm.

7. An electric motor circuit according to claim 1, wherein the switch-off circuit is provided with a positive feedback for stabilizing the electrical condition after the first current branch of the current minor has been rendered conductive.

8. An electric motor circuit according claim 1, wherein the transfer of the voltage generated by the current sensor to the first branch of the current minor is instantaneous.

9. An electric motor circuit according claim 1, wherein the circuit is of complementary design for driving an electric motor of the DC-type forwards or backwards, as desired.

10. An electric motor circuit according to claim 1, wherein the circuit is configured to cause the supply current to increase gradually at start-up of said electric motor.

11. An electric motor circuit according to claim 10, wherein a terminal configured for communication with a ground of said electric motor is provided with a feedback using a high-pass filter.

12. An electric motor circuit according to claim 11, wherein a terminal for controlling the electronic switch is grounded via a transient short-circuit connection.

13. An electric motor circuit according to claim 10, wherein an additional resistive element is configured to be connected in series with said electric motor and wherein the additional resistive element is configured such that the resistive value decreases with increasing operating temperature.

* * * * *

UNITED STATES PATENT AND TRADEMARK OFFICE
CERTIFICATE OF CORRECTION

PATENT NO.      : 8,106,614 B2
APPLICATION NO. : 12/375131
DATED           : January 31, 2012
INVENTOR(S)     : Niesing et al.

It is certified that error appears in the above-identified patent and that said Letters Patent is hereby corrected as shown below:

COLUMN 8, Line 3, (Claim 1, line 2) "minor" should be -- mirror --

COLUMN 8, Line 42, (Claim 7, line 4) "minor" should be -- mirror --

COLUMN 8, Line 45, (Claim 8, line 3) "minor" should be -- mirror --

Signed and Sealed this
Twenty-seventh Day of March, 2012

David J. Kappos
*Director of the United States Patent and Trademark Office*